(12) United States Patent
Takahashi et al.

(10) Patent No.: US 10,397,923 B2
(45) Date of Patent: Aug. 27, 2019

(54) USER EQUIPMENT

(71) Applicant: NTT DOCOMO, INC., Tokyo (JP)

(72) Inventors: Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/574,917

(22) PCT Filed: Feb. 4, 2016

(86) PCT No.: PCT/JP2016/053392
§ 371 (c)(1),
(2) Date: Nov. 17, 2017

(87) PCT Pub. No.: WO2016/189893
PCT Pub. Date: Dec. 1, 2016

(65) Prior Publication Data
US 2018/0167943 A1 Jun. 14, 2018

(30) Foreign Application Priority Data
May 22, 2015 (JP) .................................. 2015-104695

(51) Int. Cl.
| H04W 4/00 | (2018.01) |
| H04W 72/04 | (2009.01) |
| H04W 8/24 | (2009.01) |
| H04W 8/22 | (2009.01) |

(52) U.S. Cl.
CPC ......... *H04W 72/0453* (2013.01); *H04W 8/22* (2013.01); *H04W 8/24* (2013.01)

(58) Field of Classification Search
CPC combination set(s) only.
See application file for complete search history.

(56) References Cited

U.S. PATENT DOCUMENTS

| 9,137,804 B2* | 9/2015 | Lin ..................... H04W 72/048 |
| 2011/0216730 A1* | 9/2011 | Kim ..................... H04L 5/0007 370/329 |

(Continued)

FOREIGN PATENT DOCUMENTS

| EP | 3288306 A1 | 2/2018 |
| JP | 2011-182104 A | 9/2011 |

OTHER PUBLICATIONS

TSG-RAN Working Group 4 (Radio) meeting #66bis R4-131579 Chicago, IL, US, Apr. 15-19, 2013: Source: Ericsson, ST-Ericsson Title: Draft Reply LS on UE CA Capabilities: Agenda item: 4.2.1.*

(Continued)

*Primary Examiner* — Chi H Pham
*Assistant Examiner* — Fahmida S Chowdhury
(74) *Attorney, Agent, or Firm* — Osha Liang LLP

(57) ABSTRACT

A user equipment that includes a transmission and reception unit configured to transmit and receive a radio signal to and from a base station and a capability information indication unit configured to transmit capability information to the base station. The capability information indicates carrier aggregation (CA) capable carrier combinations as well as bandwidths of the respective carriers. The capability information indication unit indicates that all carrier combinations indicated in the capability information are CA capable.

4 Claims, 15 Drawing Sheets

(56) References Cited

U.S. PATENT DOCUMENTS

2011/0243083 A1* 10/2011 Zhang ............... H04W 8/22
370/329
2014/0092825 A1* 4/2014 Bostrom ............ H04W 72/048
370/329

OTHER PUBLICATIONS

3GPP TS 38.331,3rd Generation Partnership Project (3GPP), Mobile Competence Centre ; 650, Route Des Lucioles ; F-Q8921 Sophia-Antipolis Cedex ; France, vol. RAN WG2, No. VI2.5.0, Mar. 27, 2015 (Mar. 27, 2015), pp. 1-445, XPQ5Q92813Q.*
International Search Report issued in corresponding application No. PCT/JP2016/053392 dated Mar. 22, 2016 (4 pages).
Witten Opinion of the International Searching Authority issued in corresponding application No. PCT/JP2016/053392 dated Mar. 22, 2016 (4 pages).
3GPP TS 36.331 V125.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2015 (445 pages).
3GPP TS 36.306 V12.4.0, "3rd Generation Partnership Project; Technical Specification Group Radio Access Network; Evolved Universal Terrestrial Radio Access (E-UTRA); User Equipment (UE) radio access capabilities (Release 12)"; Mar. 2015 (41 pages).
3GPP TS 36.101 V12.7.0, "3rd Generation Partnership Project; Technical Specification Group Radio Access Network; Evolved Universal Terrestrial Radio Access (E-UTRA); User Equipment (UE) radio transmission and reception (Release 12)"; Mar. 2015 (659 pages).
Extended European Search Report issued in corresponding European Application No. 16799602.4, dated Apr. 30, 2018 (14 pages).
Ericsson et al.; "Draft Reply LS on UE CA Capabilities"; TSG-RAN Working Group 4 (Radio) meeting #66bis, R4-131579; Chicago, IL, US; Apr. 15-19, 2013 (5 pages).
Office Action issued in the counterpart Japanese Patent Application No. 2017-520251, dated Sep. 11, 2018 (7 Pages).
NTT DOCOMO, Inc. et al.; "Interpretation of intra-band non-contiguous CA capability"; 3GPP TSG-RAN WG2 #91 R2-153103; Aug. 24-28, 2015, Beijing, P.R. China (4 pages).
Office Action issued in the counterpart Japanese Patent Application No. 2017520251, dated Mar. 5, 2019 (5 pages).
Office Action issued in the counterpart European Patent Application No. 16799602.4, dated Mar. 27, 2019 (7 pages).

* cited by examiner

FIG.12

```
UE-EUTRA-Capability information element

-- ASN1START
<< skip unrelated part >>
RF-Parameters-v1020 ::=            SEQUENCE {
    supportedBandCombination-r10         SupportedBandCombination-r10
}

RF-Parameters-v1060 ::=            SEQUENCE {
    supportedBandCombinationExt-r10      SupportedBandCombinationExt-r10
}

RF-Parameters-v1090 ::=            SEQUENCE {
    supportedBandCombination-v1090       SupportedBandCombination-v1090       OPTIONAL
}

RF-Parameters-v10f0 ::=            SEQUENCE {
    modifiedMPR-Behavior-r10             BIT STRING (SIZE (32))               OPTIONAL
}

SupportedBandCombination-r10 ::= SEQUENCE (SIZE (1..maxBandComb-r10)) OF
BandCombinationParameters-r10

SupportedBandCombinationExt-r10 ::= SEQUENCE (SIZE (1..maxBandComb-r10)) OF
BandCombinationParametersExt-r10

SupportedBandCombination-v1090 ::= SEQUENCE (SIZE (1..maxBandComb-r10)) OF
BandCombinationParameters-v1090

BandCombinationParameters-r10 ::= SEQUENCE (SIZE (1..maxSimultaneousBands-r10)) OF
BandParameters-r10

BandCombinationParametersExt-r10 ::= SEQUENCE {
    supportedBandwidthCombinationSet-r10 SupportedBandwidthCombinationSet-r10   OPTIONAL
}

BandCombinationParameters-v1090 ::= SEQUENCE (SIZE (1..maxSimultaneousBands-r10)) OF
BandParameters-v1090

SupportedBandwidthCombinationSet-r10 ::= BIT STRING (SIZE (1..maxBandwidthCombSet-r10))

BandParameters-r10 ::= SEQUENCE {
    bandEUTRA-r10                        INTEGER (1..64),
    bandParametersUL-r10                 BandParametersUL-r10                 OPTIONAL,
    bandParametersDL-r10                 BandParametersDL-r10                 OPTIONAL
}

BandParameters-v1090 ::= SEQUENCE {
    bandEUTRA-v1090                      FreqBandIndicator-v9e0               OPTIONAL,
    ...
}

BandParametersUL-r10 ::= SEQUENCE (SIZE (1..maxBandwidthClass-r10)) OF
CA-MIMO-ParametersUL-r10
```

| UE-EUTRA-Capability field descriptions | FDD/ TDD diff |
|---|---|
| BandCombinationParameters-r10<br>For intra-band non-contiguous band combination, The entries of BandParameters-r10 are listed in ascending order of carrier frequency | - |

FIG.13

(A)
```
BandParametersDL-v13xy ::= SEQUENCE (SIZE (1..maxBands-r10)) OF CA-BandwidthClass-r10 ←ASCENDING ORDER OF FREQUENCY
CA-BandwidthClass-r10 ::= ENUMERATED {a, b, c, d, e, f, ...}
```

(B)
```
BandCombinationParameters-v10xy ::= SEQUENCE {
  allCombinationSupported-r10     BOOLEAN
}
```

FIG.14

```
                        UECapabilityEnquiry message

-- ASN1START

UECapabilityEnquiry ::=            SEQUENCE {
    rrc-TransactionIdentifier          RRC-TransactionIdentifier,
    criticalExtensions                 CHOICE {
        c1                                 CHOICE {
            ueCapabilityEnquiry-r8             UECapabilityEnquiry-r8-IEs,
            spare3 NULL, spare2 NULL, spare1 NULL
        },
        criticalExtensionsFuture           SEQUENCE {}
    }
}

UECapabilityEnquiry-r8-IEs ::=     SEQUENCE {
    ue-CapabilityRequest               UE-CapabilityRequest,
    nonCriticalExtension               UECapabilityEnquiry-v8a0-IEs        OPTIONAL
}

UECapabilityEnquiry-v8a0-IEs ::= SEQUENCE {
    lateNonCriticalExtension           OCTET STRING                        OPTIONAL,
    nonCriticalExtension               UECapabilityEnquiry-v1180-IEs       OPTIONAL
}

UECapabilityEnquiry-v1180-IEs ::= SEQUENCE {
    requestedFrequencyBands-r11        SEQUENCE (SIZE (1..16)) OF FreqBandIndicator-r11
            OPTIONAL,
    nonCriticalExtension               UECapabilityEnquiry-v11xy-IEsSEQUENCE {}
        OPTIONAL
}

UECapabilityEnquiry-v11xy-IEs ::= SEQUENCE {
    reducedIntraBandNonContComb-r11    ENUMERATED {true}                   OPTIONAL,  -- Need ON
    nonCriticalExtension               SEQUENCE {}                         OPTIONAL
}

UE-CapabilityRequest ::=           SEQUENCE (SIZE (1..maxRAT-Capabilities)) OF RAT-Type

-- ASN1STOP
```

| UECapabilityEnquiry field descriptions |
|---|
| ue-CapabilityRequest<br>List of the RATs for which the UE is requested to transfer the UE radio access capabilities i.e. E-UTRA, UTRA, GERAN-CS, GERAN-PS, CDMA2000. |
| requestedFrequencyBands<br>List of frequency bands for which the UE is requested to provide supported CA band combinations and non CA bands. |
| reducedIntraBandNonContComb<br>Indicates that the UE shall explicitly exclude supported intra-band non-contiguous CA band combinations other than included in capability signalling as specified in TS 36.306 [5]. |

FIG.15

```
                    UE-EUTRA-Capability information element
-- ASN1START

UE-EUTRA-Capability ::=             SEQUENCE {
    accessStratumRelease                AccessStratumRelease,
    ue-Category                         INTEGER (1..5),
    pdcp-Parameters                     PDCP-Parameters,
    phyLayerParameters                  PhyLayerParameters,
    rf-Parameters                       RF-Parameters,
    measParameters                      MeasParameters,
    featureGroupIndicators              BIT STRING (SIZE (32))
    interRAT-Parameters             SEQUENCE {
        utraFDD
```

```
    nonCriticalExtension                SEQUENCE {}                OPTIONAL
}

UE-EUTRA-Capability-v11xy-IEs ::=   SEQUENCE {
    rf-Parameters-v11xy                 RF-Parameters-v11xy,
    nonCriticalExtension                SEQUENCE {}                OPTIONAL
}

-- Regular non critical extensions
```

```
}

RF-Parameters-v11xy ::=             SEQUENCE {
    reducedIntraBandNonContComb-r11     ENUMERATED {supported, true}  OPTIONAL
}
```

```
    ue-Rx-TxTimeDiffMeasurements-r11    ENUMERATED {supported}     OPTIONAL
}

Other-Parameters-v11d0 ::=          SEQUENCE {
    inDeviceCoexInd-UL-CA-r11           ENUMERATED {supported}     OPTIONAL
}

MBMS-Parameters-r11 ::=             SEQUENCE {
    mbms-SCell-r11                      ENUMERATED {supported}     OPTIONAL,
    mbms-NonServingCell-r11             ENUMERATED {supported}     OPTIONAL
}

-- ASN1STOP
```

| *reducedIntraBandNonContComb* Indicates whether the UE supports receiving *reducedIntraBandContComb* that requests the UE to exclude supported intra-band non-contiguous CA band combinations other than included in capability signalling as specified in TS 36.306 [5]. | : |
|---|---|

4.3.5.16   reducedIntraBandNonContComb-r11

This field defines whether the UE supports receiving reducedIntraBandContComb that requests the UE to include one intra-band non-contiguous CA band combination and exclude the other intra-band non-contiguous CA band combinations for which their support can be declared by the reported intra-band non-contiguous CA band combination.

For instance, if CA bandwidth classes are different in an intra-band combination, one band combination entry (e.g., CA_41A-41C) can indicate support of any other possible permutations (e.g., CA_41C-41A). If all CA bandwidth classes are the same in an intra-band combination, one band combination entry can indicate support of any other possible permutations in the presence of uplink CA bandwidth class (e.g., DL: CA_42A-42A, UL: 42A).

USER EQUIPMENT

TECHNICAL FIELD

The present invention relates to a radio communication system.

BACKGROUND ART

Presently, as a next-generation communication standard of LTE (Long Term Evolution) systems, sophistication of LTE-Advanced is being developed. In LTE-Advanced systems, carrier aggregation (CA) technique is introduced to achieve a higher throughput than that of the LTE systems while ensuring backward compatibility with the LTE systems. In the carrier aggregation, a component carrier (CC) having the maximum bandwidth of 20 MHz supported by the LTE systems is used as a basic component, and it is designed to achieve broader band communication by using these multiple component carriers simultaneously.

In the carrier aggregation, user equipment (UE) can use multiple component carriers simultaneously to communicate with a base station (evolved NodeB: eNB). In the carrier aggregation, a highly reliable primary cell (PCell) to ensure connectivity to the user equipment and a secondary cell (SCell) additionally configured for the user equipment during connection to the primary cell are configured. The primary cell is a cell similar to a serving cell in the LTE systems and serves as a cell to ensure connectivity between the user equipment and a network. On the other hand, the secondary cell is a cell configured for the user equipment in additional to the primary cell.

In the LTE standard, as illustrated in FIG. 1, Intra-band Non-contiguous CA, where multiple discontinuous carriers are bounded in the same frequency band, can be applied. In the Intra-band Non-contiguous CA, as illustrated, the carrier aggregation is performed with the multiple separated carriers in frequency band "BandX". In 3GPP TS 36.101, combinations of Intra-band Non-contiguous CA capable carriers as illustrated in FIG. 2 are defined. Here, "CA_41A-41C" indicates that carrier 41A of a bandwidth (BW) class A (for example, 20 MHz) and carrier 41C of a BW class C (for example, 40 MHz) having a frequency higher than that of the carrier 41A in band 41 are a CA capable combination. Also, "CA_41C-41A" indicates that carrier 41C and carrier 41A having a frequency higher than that of the carrier 41C are a CA capable combination.

PRIOR ART TECHNICAL DOCUMENT

Non-Patent Document

Non-patent document 1: 3GPP TS 36.101 V12.7.0 (2015 March)
Non-patent document 2: 3GPP TS 36.331 V12.5.0 (2015 March)

SUMMARY OF INVENTION

Problem to be Solved by the Invention

In the LTE system, the user equipment transmits capability information to a base station to indicate capability of the user equipment. In the current LTE standard (non-patent document 2), the user equipment indicates the CA capable carrier combinations by the capability information as illustrated in FIG. 3. Specifically, according to the illustrated capability information, the user equipment indicates that the carrier aggregation with the two carriers in downlink, BW class A (41A) and BW class C (41C) in band 41, is supported and uplink communication is enabled with carriers corresponding to carrier 41A.

However, the capability information only can indicate that the two carriers 41A and 41C are CA capable in downlink and cannot appropriately indicate that any one or both of "41A-41C" and "41C-41A" as illustrated in FIG. 2 is supported.

In light of the above-stated problems, an object of the present invention is to provide user equipment that can indicate CA capable carrier combinations to base stations.

Means for Solving the Problem

In order to achieve the above object, one aspect of the present invention relates to user equipment, comprising: a transmission and reception unit configured to transmit and receive a radio signal to and from a base station; and a capability information indication unit configured to transmit capability information to the base station, wherein the capability information indicates carrier aggregation (CA) capable carrier combinations as well as bandwidths of the respective carriers, wherein the capability information indication unit indicates that all carrier combinations indicated in the capability information are CA capable.

Advantage of the Invention

According to the present invention, the user equipment can indicate the CA capable carrier combinations to the base stations.

BRIEF DESCRIPTION OF DRAWINGS

FIG. 12 is a diagram for illustrating a signaling data structure according to one embodiment of the present invention;

FIG. 13 is a diagram for illustrating a signaling data structure according to one embodiment of the present invention;

FIG. 14 is a diagram for illustrating a signaling data structure according to one embodiment of the present invention; and FIG. 15 is a diagram for illustrating a signaling data structure according to one embodiment of the present invention.

EMBODIMENTS OF THE INVENTION

Embodiments of the present invention are described below with reference to the drawings.

In the embodiments below, user equipment having a carrier aggregation function is disclosed. Summarizing the embodiments as stated below, the user equipment indicates to a base station carrier aggregation capable carrier combinations within a certain frequency band in capability information. For example, if the user equipment supports a reporting omission function, instead of indicating each of all CA capable combinations, the user equipment indicates only one of the combinations in the capability information. Upon receiving the single combination from the user equipment supporting the reporting omission function, the base station can determine that all the combinations composed from the indicated combination are CA capable.

Also, the descriptive order of "BandParameters-r10" indicative of two carriers has no significance in the capability information according to the current LTE standard, and the base station receiving the capability information cannot determine whether the user equipment supports either "41A-41C" or "41C-41A".

Also, in the case where downlink carriers of the same BW class such as "41A-41A" are supported, according to the capability information in the current LTE standard, the base station cannot identify which uplink carrier corresponding to one of the downlink carriers is supported. Specifically, as illustrated, two cases are assumed from the single capability information, and the base station cannot determine which of the two cases is supported by the user equipment. Then, the capability information is described in such a manner that the frequency order of carriers in the carrier combination can be identified. As a result, the base station receiving the capability information can identify not only the CA capable carrier combinations supported by the user equipment but also a carrier configuration related to frequencies of the individual carriers, and accordingly the proper carrier aggregation can be performed.

Figure 5A:
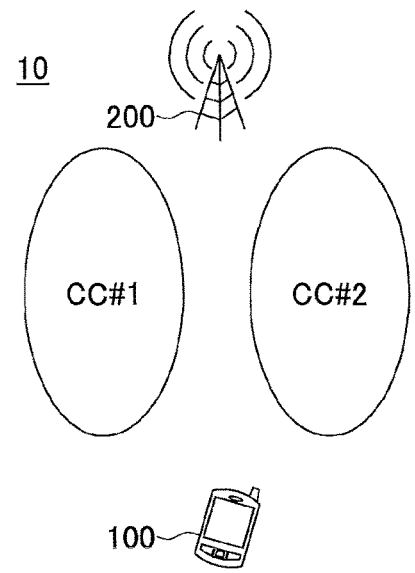
FIG. 5A is a schematic diagram for illustrating a radio communication system according to one embodiment of the present invention.

A radio communication system according to one embodiment of the present invention is described with reference to FIG. 5A. FIG. 5A is a schematic diagram for illustrating a radio communication system according to one embodiment of the present invention.

As illustrated in FIG. 5A, the radio communication system 10 has user equipment 100 and a base station 200. The radio communication system 10 supports carrier aggregation where the user equipment 100 uses a primary cell (PCell) and a secondary cell (SCell) served from the base station 200 simultaneously for communication and specifically may be an LTE-Advanced system. As illustrated, the user equipment 100 uses two carriers CC#1 and CC#2 to communicate with the base station 200. In the illustrated embodiment, only the base station 200 is illustrated, but a large number of base stations are generally disposed to cover a service area of the radio communication system 10.

Figure 5B:
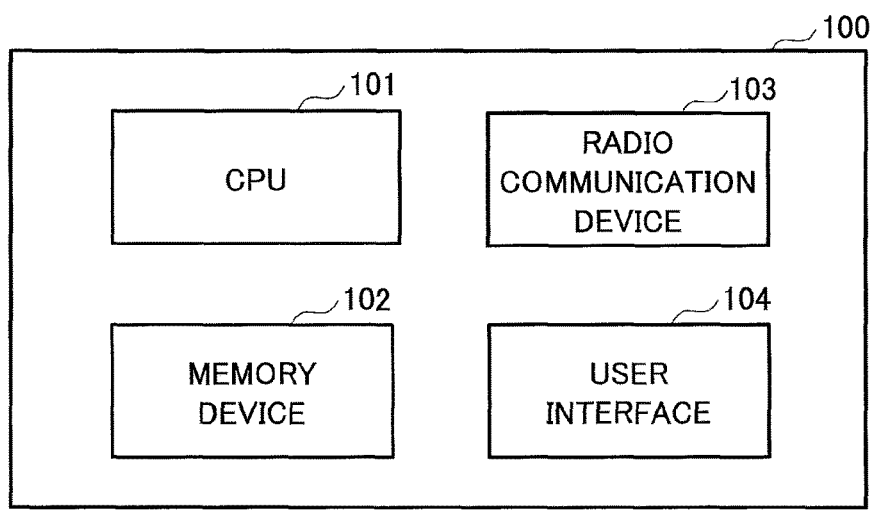
FIG. 5B is a block diagram for illustrating a hardware arrangement of user equipment according to one embodiment of the present invention.

The user equipment 100 has a carrier aggregation function to use multiple carriers served from the base station 200 simultaneously to communicate with the base station 200. Typically, as illustrated, the user equipment 100 may be any appropriate information processing device with a radio communication function such as a smartphone, a mobile phone, a tablet, a mobile router and a wearable terminal. As illustrated in FIG. 5B, the user equipment 100 is arranged with a CPU (Central Processing Unit) 101 such as a processor, a memory device 102 such as a RAM (Random Access Memory) and a flash memory, a radio communication device 103 for transmitting and receiving radio signals to/from the base station 200, a user interface 104 such as an I/O device and a peripheral device and so on. For example, functions and operations of the user equipment 100 as stated below may be implemented by the CPU 101 processing and running data and programs stored in the memory device 102. However, the user equipment 100 is not limited to the above-stated hardware configuration and may be arranged with circuits for implementing one or more of operations as stated below.

The base station 200 is wirelessly connected to the user equipment 100 to transmit downlink (DL) packets received from network devices, such as an upper station and a server, communicatively connected on a core network (not shown) to the user equipment 100, as well as transmit uplink (UL) packets received from the user equipment 100 to the network devices. In the illustrated embodiment, the base station 200 serves two carriers CC#1 and CC#2 and has the carrier aggregation function to use these carriers simultaneously for communication.

Figure 5C:
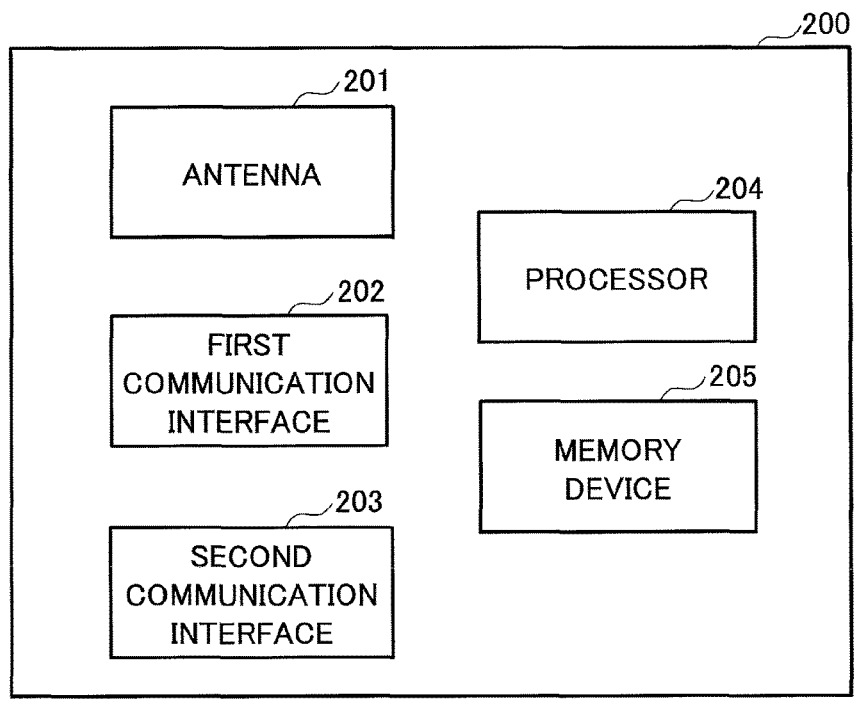
FIG. 5C is a block diagram for illustrating a hardware arrangement of a base station according to one embodiment of the present invention.

As illustrated in FIG. 5C, the base station 200 is typically arranged with hardware resources such as an antenna 201 for transmitting and receiving radio signals to/from the user equipment 100, a first communication interface 202 (an X2 interface or the like) for communicating with an adjacent base station, a second communication interface 203 (an S1 interface or the like) for communicating with a core network, a processor 204 or circuit for processing signals transmitted and received to/from the user equipment 100 and a memory device 205. Functions and operations of the base station 200 as stated below may be implemented by the processor 204 processing or running data or programs stored in the memory device 205. However, the base station 200 is not limited to the above-stated hardware arrangement and may have any other appropriate hardware resources.

Figure 6:
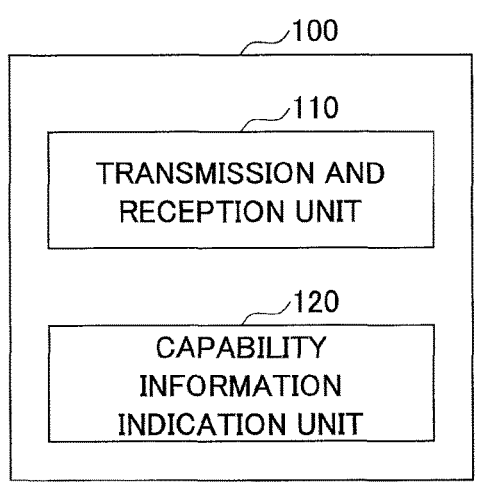
FIG. 6 is a block diagram for illustrating an arrangement of the user equipment according to one embodiment of the present invention.

Next, the user equipment 100 according to one embodiment of the present invention is described with reference to FIGS. 6-13. FIG. 6 is a block diagram for illustrating an arrangement of the user equipment 100 according to one embodiment of the present invention.

As illustrated in FIG. 6, the user equipment 100 has a transmission and reception unit 110 and a capability information indication unit 120.

The transmission and reception unit 110 transmits and receives a radio signal to/from the base station 200. Specifically, in downlink communication, the transmission and reception unit 110 receives various downlink channels such as a PDCCH (Physical Downlink Control Channel) and a PDSCH (Physical Downlink Shared Channel) from the base station 200. On the other hand, in uplink communication, the transmission and reception unit 110 transmits various uplink channels such as a PUCCH (Physical Uplink Control Channel) and a PUSCH (Physical Uplink Shared Channel) to the base station 200. Also, if carrier aggregation is configured by the base station 200, the transmission and reception unit 110 uses multiple configured carriers simultaneously to communicate with the base station 200.

The capability information indication unit 120 transmits capability information to the base station 200 to indicate CA capable carrier combinations as well as bandwidths of respective carriers. Then, the capability information indication unit 120 transmits the capability information where the CA capable carrier combinations are described to identify the order of frequencies of the respective carriers. Specifically, it is assumed that the user equipment 100 is CA capable with a combination (BandXA-BandXC) of a carrier (BandXA) of a BW class A (for example, 20 MHz) in Band X and a carrier (BandXC) of a BW class C (for example, 40 MHz) having a higher frequency than that of BandXA in Band X. Then, the capability information indication unit 120 transmits the capability information to the base station 200 to indicate not only the CA capability with the combination of the two carriers BandXA and BandXC but also identify the order of frequencies where BandXA has a lower frequency while BandXC has a higher frequency.

In one embodiment, the capability information indication unit 120 may list respective carriers in the ascending order of frequencies in the capability information. Specifically, the capability information indication unit 120 may list the respective carriers of the CA capable carrier combinations in the capability information in the ascending order of frequencies of the respective carriers. In other words, the listing order of the respective carriers in the capability information according to this embodiment has significance, although the listing order of the respective carriers has no significance in the current LTE standard.

Figure 7:
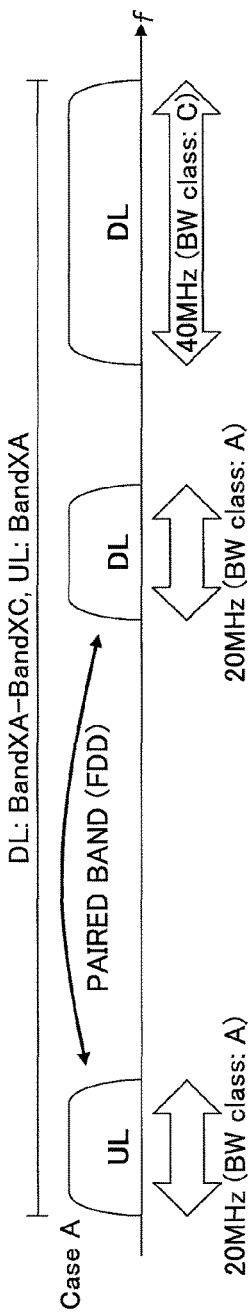
FIG. 7 is a diagram for illustrating a signaling data structure according to one embodiment of the present invention.

As one example, as illustrated in FIG. 7, it is assumed that the user equipment 100 is downlink (DL) CA capable with the combination (BandXA-BandXC) of BandXA and BandXC having a higher frequency than BandXA, and uplink communication with a band paired with BandXA is enabled. Then, as illustrated in FIG. 7, in "BandCombinationParameters-r10" to indicate CA supported carrier combinations, the capability information indication unit 120 describes "BandParameters-r10" indicative of downlink BandXA having a lower frequency and the corresponding uplink carrier in an upper position in the capability information and "BandParameters-r10" indicative of downlink BandXC having a higher frequency in a lower position in the capability information. Upon receiving the capability information, the base station 200 can determine that BandXA described in the upper position in "BandCombinationParameters-r10" has a lower frequency and BandXC described in the lower position has a higher frequency and understand that it can communicate with the user equipment 100 with the carrier configuration as illustrated in FIG. 7.

Figure 8:
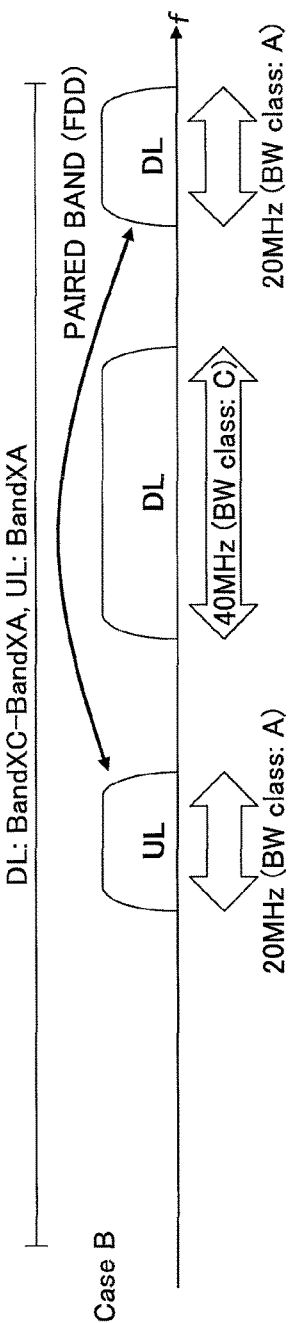
FIG. 8 is a diagram for illustrating a signaling data structure according to one embodiment of the present invention.

Alternatively, as another example, it is assumed that the user equipment 100 is DL CA capable with the combination (BandXC-BandXA) of BandXC and BandXA having a higher frequency than BandXC and can communicate in a band paired with BandXA for uplink. Then, the capability information indication unit 120 describes "BandParameters-r10" indicative of downlink BandXC having a lower frequency in an upper position in the capability information and "BandParameters-r10" indicative of downlink BandXA having a higher frequency and the corresponding uplink carrier in a lower position in the capability information in "BandCombinationParameters-r10" as illustrated in FIG. 8. Upon receiving the capability information, the base station 200 can determine that BandXC described in the upper position in "BandCombinationParameters-r10" has a lower frequency and BandXA described in the lower position has a higher frequency and understand that it can communicate with the user equipment 100 in the carrier configuration as illustrated in FIG. 8.

Figure 9:
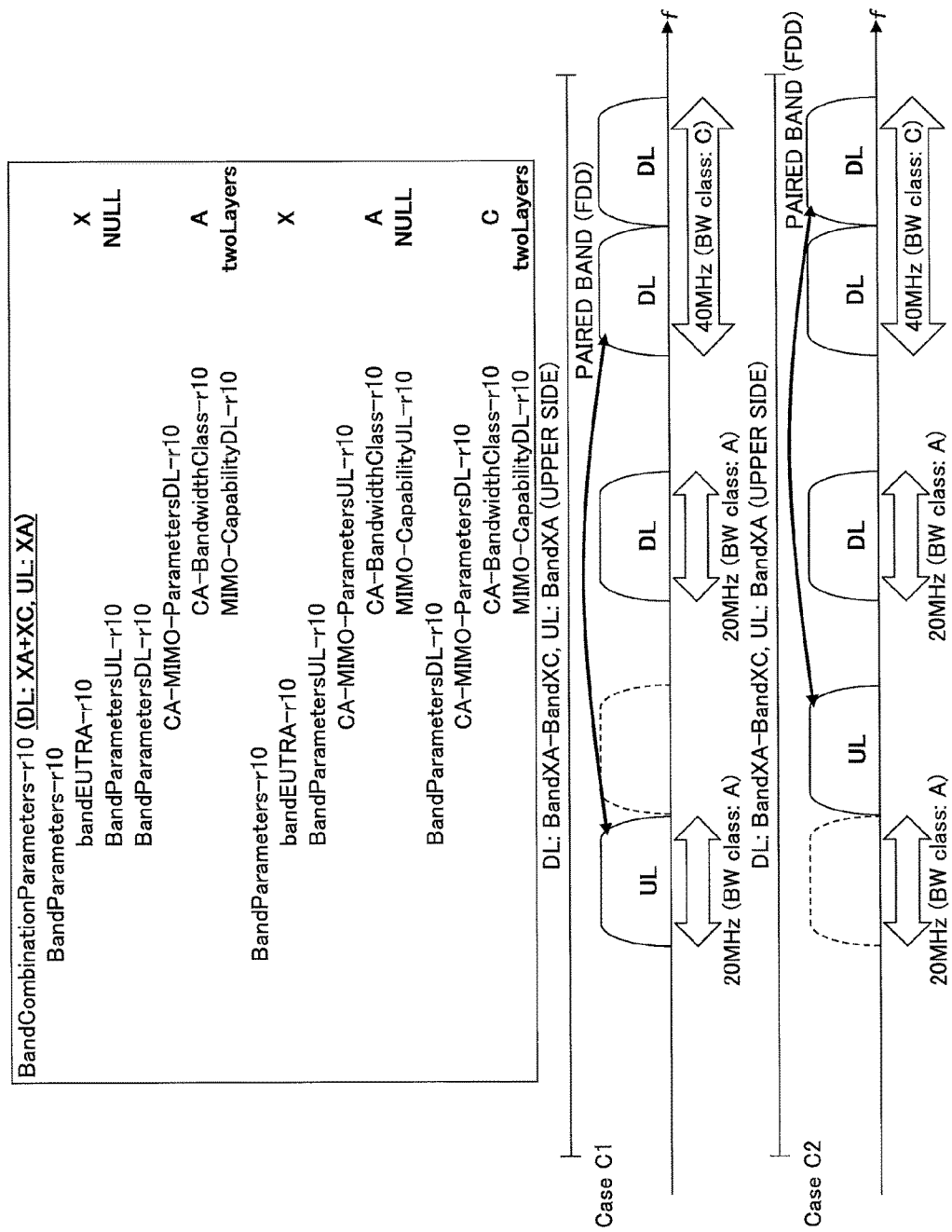
FIG. 9 is a diagram for illustrating a signaling data structure according to one embodiment of the present invention.

Also, as another example, it is assumed that as illustrated in FIG. 9, the user equipment 100 is DL CA capable with the combination (BandXA-BandXC) of BandXA and BandXC having a higher frequency than BandXA and can communicate in a band paired with BandXC for uplink. Then, the capability information indication unit 120 describes "BandParameters-r10" indicative of downlink BandXA having a lower frequency in an upper position in the capability information and "BandParameters-r10" indicative of downlink BandXC having a higher frequency and the corresponding uplink carrier in a lower position in the capability information in "BandCombinationParameters-r10" as illustrated in FIG. 9. Upon receiving the capability information, the base station 200 can determine that BandXA described in the upper position in "BandCombinationParameters-r10" has a lower frequency and BandXC described in the lower position has a higher frequency and understand that it can communicate with the user equipment 100 in the carrier configuration as illustrated in FIG. 9.

Here, in the case where a carrier of a BW class A is used as an uplink carrier corresponding to BandXC (in the case where "CA-BandwidthClass-r10" in "BandParametersUL-r10" is "A"), two cases of carrier configurations as illustrated in FIG. 9 are assumed. Specifically, the case (case C1) where a lower frequency portion in the uplink carrier corresponding to BandXC is used for uplink communication and the case (case C2) where a higher frequency portion is used for uplink communication are assumed. In these cases, the capability information indication unit 120 may indicate which of the partial bands supports the uplink communication. In this manner, the capability information indication unit 120 may indicate CA capable downlink carrier combinations as well as the uplink carrier or the partial band of the uplink carrier corresponding to the downlink carrier. As a result, the base station 200 can determine whether the user equipment 100 supports the carrier configuration of either case C1 or case C2.

Figure 10:
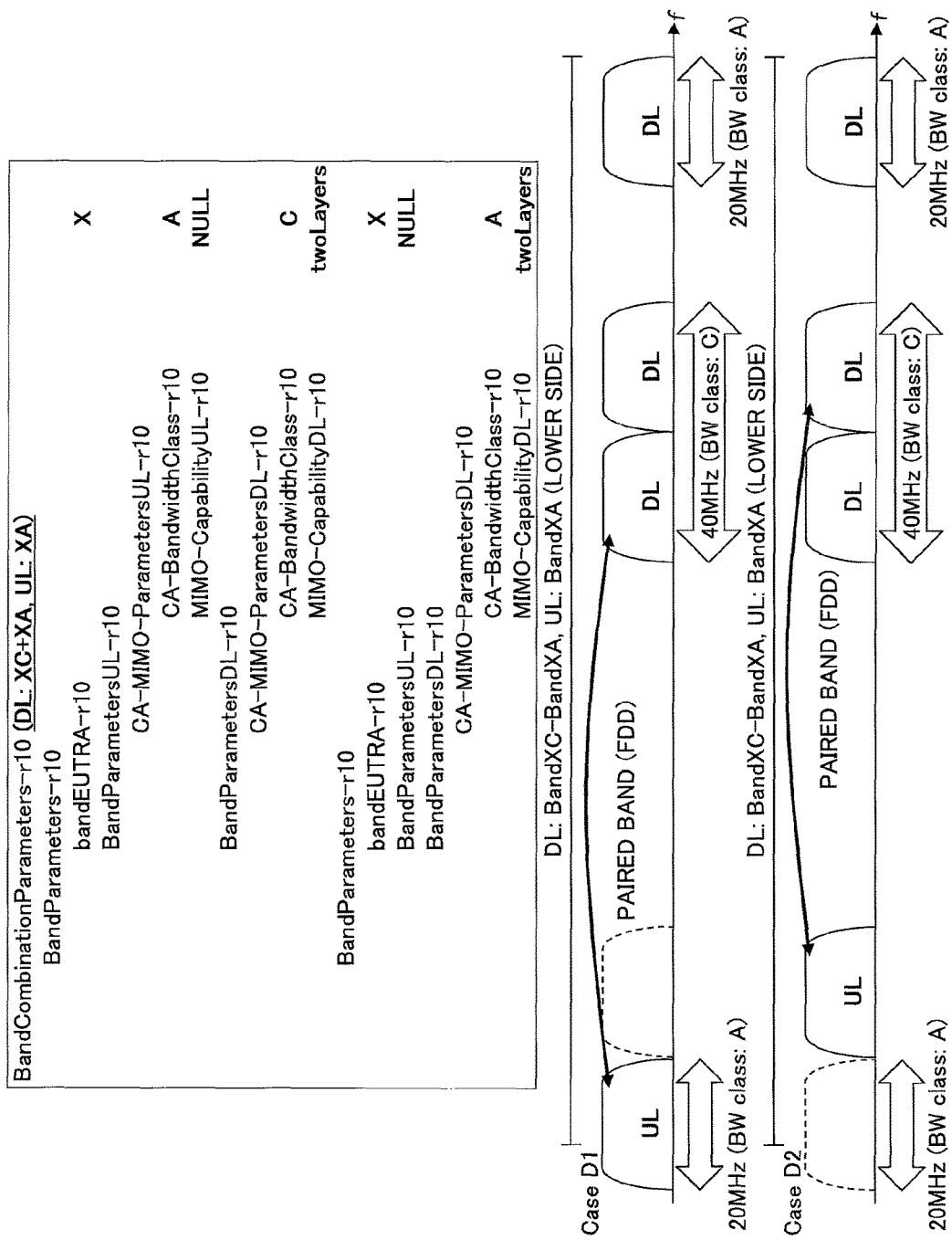
FIG. 10 is a diagram for illustrating a signaling data structure according to one embodiment of the present invention.
Figure 11:
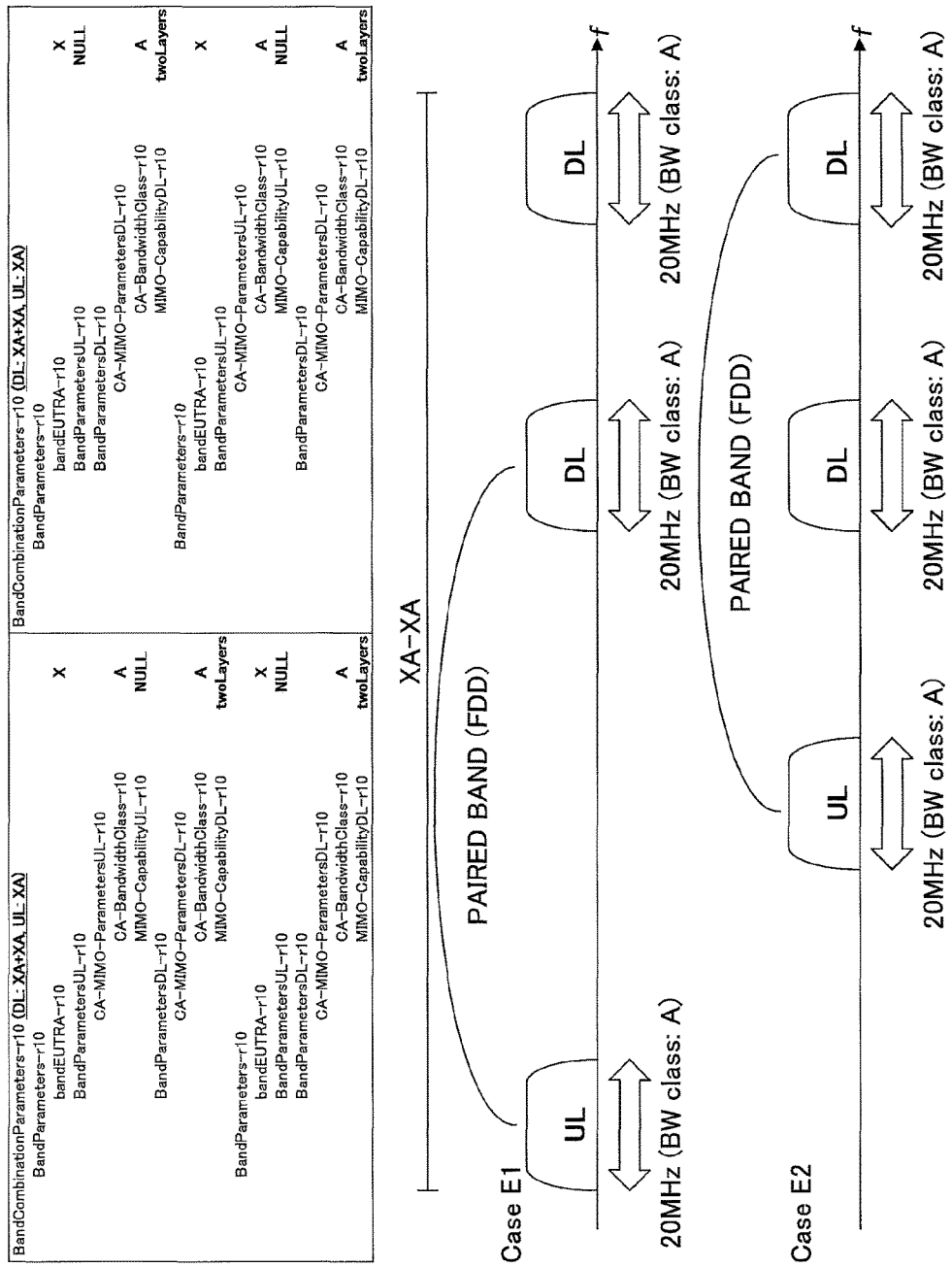
FIG. 11 is a diagram for illustrating a signaling data structure according to one embodiment of the present invention.

Also, as another example, it is assumed that as illustrated in FIG. 10, the user equipment 100 is DL CA capable with the combination (BandXC-BandXA) of BandXC and BandXA having a higher frequency than BandXC and can communicate in a band paired with BandXC for uplink. Then, the capability information indication unit 120 describes "BandParameters-r10" indicative of downlink BandXC having a lower frequency and the corresponding uplink carrier in an upper position in the capability information and "BandParameters-r10" indicative of downlink BandXA having a higher frequency in a lower position in the capability information in "BandCombinationParameters-r10" as illustrated in FIG. 10. Upon receiving the capability information, the base station 200 can determine that BandXC described in the upper position in "BandCombinationParameters-r10" has a lower frequency and BandXA described in the lower position has a higher frequency and understand that it can communicate with the user equipment 100 in the carrier configuration as illustrated in FIG. 10.

Here, in the case where a carrier of a BW class A is used as the uplink carrier corresponding to BandXC (the case where "CA-BandwidthClass-r10" in "BandParametersUL-r10" is "A"), two cases of carrier configurations as illustrated in FIG. 10 are assumed. Specifically, the case (case D1) where a lower frequency portion of the uplink carrier corresponding to BandXC is used for uplink communication and the case (case D2) where a higher frequency portion is used for uplink communication are assumed. In these cases, the capability information indication unit 120 may indicate which of the partial bands supports the uplink communication. In this manner, the capability information indication unit 120 may indicate CA capable DL carrier combinations as well as the uplink carrier corresponding to the downlink carrier or the partial band of the uplink carrier. As a result, the base station 200 can determine which of the carrier configurations of cases D1 and D2 is supported by the user equipment 100.

Here, the present invention is not limited to the above-stated two carriers and can be applied to combinations of three or more carriers. For example, it is assumed that the user equipment 100 is CA capable with the combination (BandXA-BandXC-BandXA) of a carrier (BandXA) of a BW class A in BandX, a carrier (BandXC) of a BW class C having higher frequency than that of BandXA in BandX and a carrier (BandXA) of a BW class A having a higher frequency than that of BandXC in BandX. Then, the capability information indication unit 120 may transmit the capability information to the base station 200 to not only indicate the CA capability with the combination of the BandXA and BandXC carriers but also identify the frequency order where BandXA has the lowest frequency, BandXC has the middle frequency and BandXA has the highest frequency.

In the above-stated embodiments, the indication of the multiple CA capable carriers having different BW classes is focused on. However, the present invention is not limited to the above and can be similarly applied to embodiments where multiple CA capable carriers having the same BW class are indicated. As illustrated in case E1 in FIG. 11, it is assumed that the user equipment 100 is DL CA capable with the combination (BandXA-BandXA) of BandXA and BandXA having a higher frequency than that of BandXA and can communicate in a band paired with the lower frequency BandXA for uplink. Then, as illustrated in exemplary signaling in the left side in FIG. 11, the capability information indication unit 120 describes "BandParameters-r10" indicative of downlink BandXA having a lower frequency and the corresponding uplink carrier in an upper position in the capability information and "BandParameters-r10" indicative of downlink BandXA having a higher frequency in a lower position in the capability information in "BandCombinationParameters-r10". Upon receiving the capability information, the base station 200 can determine that it can communicate with the user equipment 100 in the carrier configuration as illustrated in case E1 in FIG. 11, because the uplink carrier is described in the upper position in "BandCombinationParameters-r10". On the other hand, it is assumed that the user equipment 100 is DL CA capable with the combination (BandXA-BandXA) of BandXA and BandXA having a higher frequency that BandXA and can communicate in a band paired with the higher frequency BandXA for uplink, as illustrated in case E2 in FIG. 11. Then, as illustrated in exemplary signaling in the right side in FIG. 11, the capability information indication unit 120 describes "BandParameters-r10" indicative of the lower frequency downlink BandXA in an upper position in the capability information and "BandParameters-r10" indicative of downlink BandXA having a higher frequency and the corresponding uplink carrier in a lower position in the capability information in "BandCombinationParameters-r10". Upon receiving the capability information, the base station 200 can understand that it can communicate with the user equipment 100 in the carrier configuration as illustrated in case E2 in FIG. 11, because the uplink carrier is described in the lower position in "BandCombinationParameters-r10".

FIG. 12 is a diagram for illustrating a signaling data structure according to one embodiment of the present invention. The capability information indication unit 120 may transmit the capability information as illustrated in FIG. 12 to the base station 200. According to the illustrated capability information, after the parameter "BandCombinationParameters-r10", respective carriers in CA capable carrier combinations are specified in the parameter "BandParameters-r10" in the ascending order of frequencies.

Figure 1:
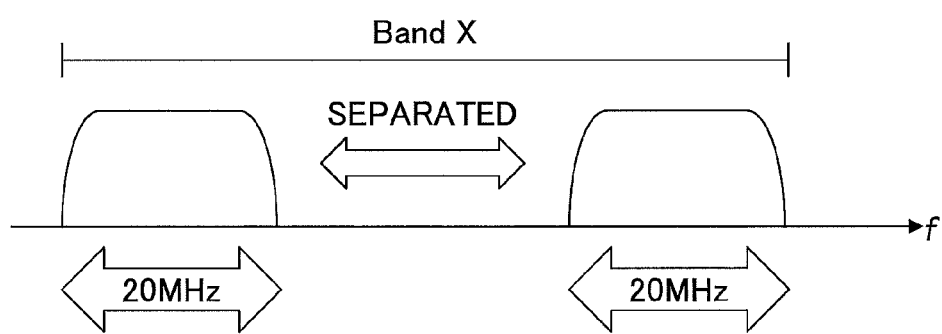
FIG. 1 is a schematic diagram for illustrating Intra-band Non-contiguous CA.
Figure 2:
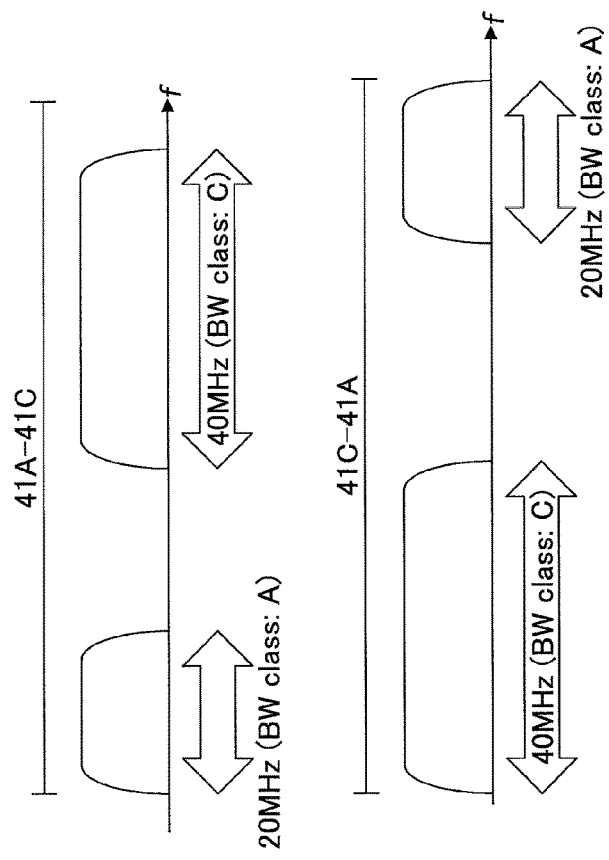
FIG. 2 is a diagram for illustrating exemplary band combinations of the Intra-band Non-contiguous CA.
Figure 3:
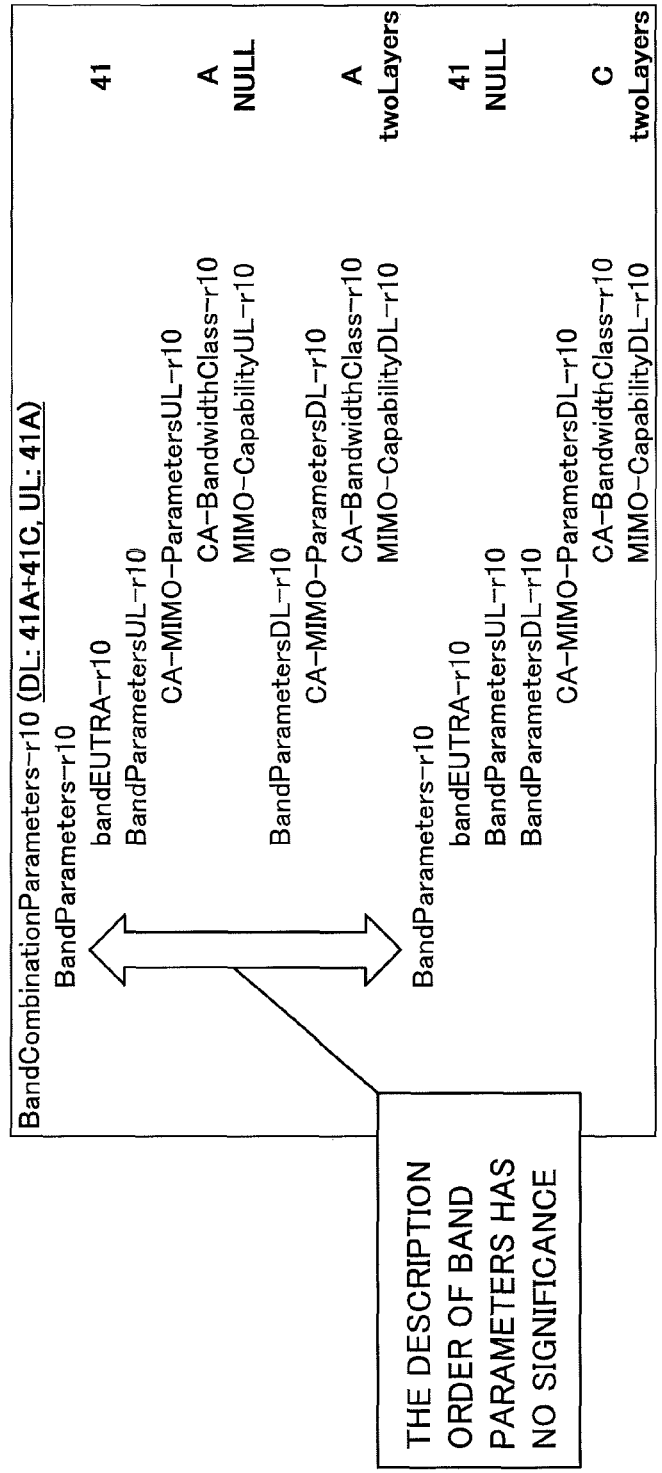
FIG. 3 is a diagram for illustrating a signaling data structure of UE capability information for indicating conventional CA band combinations.
Figure 4:
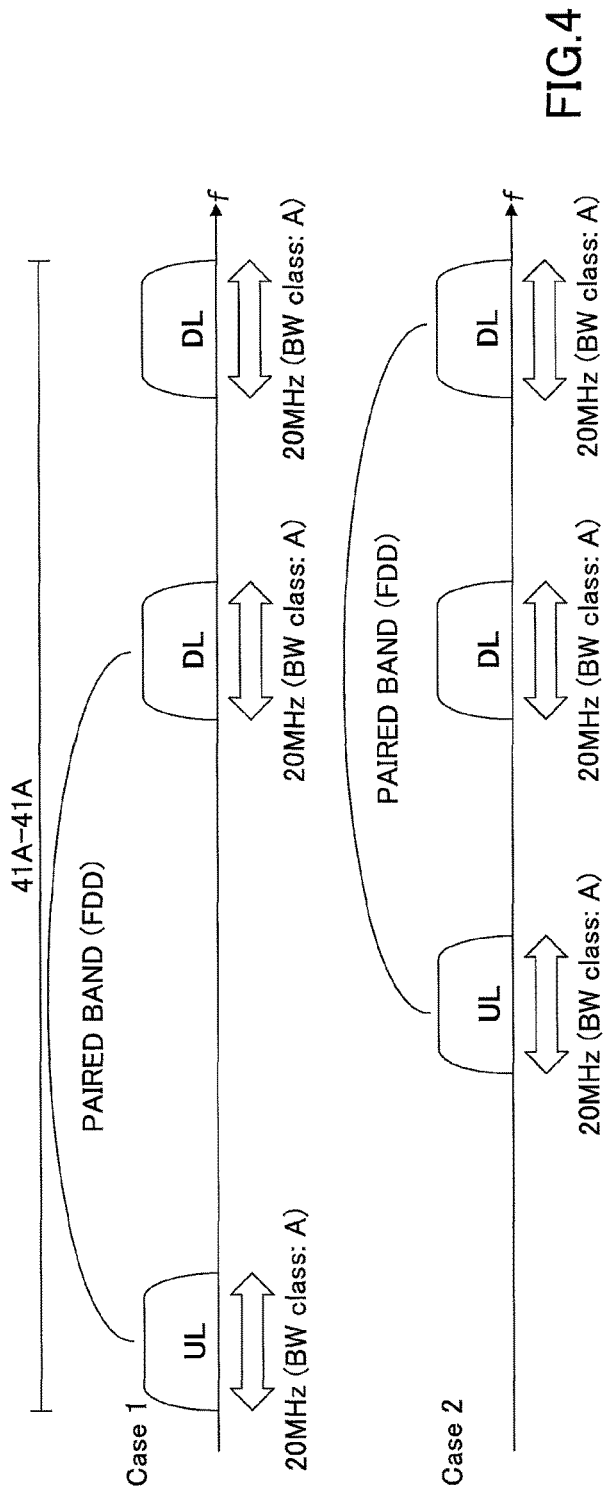
FIG. 4 is a schematic diagram for illustrating exemplary band combinations of the Intra-band Non-contiguous CA.

In other embodiments, the capability information indication unit 120 may identify the frequency order of respective carriers from the associated bandwidths. For example, if the user equipment 100 supports "BandXA-BandXC", the capability information indication unit 120 may indicate in the existing capability information as illustrated in FIG. 3 that the two carriers BandXA and BandXC are supported and indicate the frequency order of these carriers with the associated bandwidths (for example, {A, C} or the like). Similarly, if the user equipment 100 supports "BandXC-BandXA", the capability information indication unit 120 may indicate in the existing capability information as illustrated in FIG. 3 that the two carriers BandXA and BandXC are supported and indicate the frequency order of these carriers with the associated bandwidths (for example, {C, A} or the like). Specifically, the capability information indication unit 120 may add the parameter "CA-BandwidthClass-r10" as illustrated in FIG. 13A to indicate the frequency order of respective carriers in CA capable carrier combinations.

In further embodiments, the capability information indication unit 120 may indicate that all carrier combinations indicated in the capability information are CA capable. For example, it is assumed that the user equipment 100 supports all combinations of two carriers BandXA and BandXC, that is, "BandXA-BandXA", "BandXA-BandXC", "BandXC-BandXA" and "BandXC-BandXC". In this case, instead of indicating all the combinations individually, the capability information indication unit 120 may configure a parameter to indicate that all the carrier combinations specified in the capability information are CA capable. Specifically, the capability information indication unit 120 may not only indicate in the existing capability information as illustrated in FIG. 3 that the two carriers BandXA and BandXC are supported but also configure the parameter "allCombinationSupported-r10" as "TRUE" as illustrated in FIG. 13B to indicate that all combinations of these two carriers are supported.

Also, the capability information indication unit 120 may indicate one carrier combination out of all CA capable carrier combinations. Specifically, the capability information indication unit 120 may simply indicate one carrier combination out of all CA capable carrier combinations as the capability information to the base station 200 without use of the above-stated parameters in conjunction with FIG. 13B. For example, it is assumed that the user equipment 100 supports all combinations of the two carriers BandXA and BandXC, that is, "BandXA-BandXA", "BandXA-BandXC", "BandXC-BandXA" and "BandXC-BandXC".

In this case, the capability information indication unit 120 may indicate only one combination (for example, "BandXA-BandXC" or the like) as the capability information to the base station 200 instead of indicating all the combinations individually. Upon receiving the combination, the base station 200 determines that all the other combinations composed of the combination, that is, "BandXA-BandXA", "BandXA-BandXC", "BandXC-BandXA" and "BandXC-BandXC" are CA capable. In this embodiment, it can be indicated that all the combinations composed of the indicated combination are CA capable by merely indicating the one combination without use of any special parameter.

Furthermore, a reporting omission function to indicate one combination to explicitly indicate that all the other combinations composed of the indicated combination are CA capable may be configured for the user equipment 100. In the case where the user equipment 100 supports the reporting omission function, when the user equipment 100 is instructed by the base station 200 to enable the reporting omission function, the capability information indication unit 120 indicates that the reporting omission function is enabled and indicates one combination of all CA capable combinations to the base station 200. Specifically, as illustrated in FIG. 14, the base station 200 transmits a capability information request "UECapabilityEnquiry", including the parameter "reducedIntraBandNonContComb" for causing the reporting omission function to be enabled, to the user equipment 100. For this capability information request, as illustrated in FIG. 15, the user equipment 100 supporting the reporting omission function indicates only one combination in the capability information "UE-EUTRA-Capability" rather than all CA capable combinations. Upon receiving the capability information, the base station 200 can determine that all the combinations composed of the received combination are CA capable.

For example, it is assumed that the user equipment 100 supporting the reporting omission function supports all combinations of two carriers BandXA and BandXC, that is, "BandXA-BandXA", "BandXA-BandXC", "BandXC-BandXA" and "BandXC-BandXC". Then, when the base station 200 transmits a "UECapabilityEnquiry" with "reducedIntraBandNonContComb=true" to the user equipment 100, the capability information indication unit 120 indicates "reducedIntraBandNonContComb=supported" to indicate that the reporting omission function is supported as well as the one combination "BandXA-BandXC". In this case, the base station 200 can determine that the user equipment 100 supports the other combinations "BandXA-BandXA", "BandXC-BandXA" and "BandXC-BandXC" together with the indicated "BandXA-BandXC". In this manner, upon receiving the capability information request from the base station 200 for causing the reporting omission function to be enabled, the capability information indication unit 120 may indicate support of the user equipment 100 for the reporting omission function as well as the single carrier combination.

The above-stated embodiments have been focused on the LTE system and the LTE-Advanced system, but the present invention is not limited to the above and may be applied to radio communication systems using CDMA (Code Division Multiple Access) 2000, Ultra Mobile Broadband (UMB), IEEE 802.11 (Wi-Fi), IEEE 802.16 (WiMAX), IEEE 802.20, Ultra-Wideband (UWB), Bluetooth (registered trademark) and/or any other appropriate system. Also, the above-stated information and signals may be represented with use of various techniques and any of the techniques. For example, data, instructions, commands, information, signals, bits, symbols and chips referred to throughout the above-stated embodiments may be represented with voltages, currents, electromagnetic waves, magnetic fields or magnetic particles, optical fields or photons, or any combination thereof. Also, if software is transmitted from a website, a server or other remote sources by using coaxial cables, optical fiber cables, twist pairs, digital subscriber lines (DSL) or wireless techniques such as infrared, radio and micro waves, coaxial cables, optical fiber cables, twist pairs, digital subscriber lines (DSL) or wireless techniques such as infrared, radio and micro waves are included in definition of a transmission medium.

Although the embodiments of the present invention have been described in detail, the present invention is not limited to the above-stated specific embodiments, and various modifications and variations can be made within the spirit of the present invention as recited in claims.

This international patent application is based on and claims priority of Japanese Priority Application No. 2015-104695 filed on May 22, 2015, the entire contents of which are hereby incorporated by reference.

LIST OF REFERENCE SYMBOLS

10: radio communication system
100: user equipment
110: transmission and reception unit
120: capability information indication unit
200: base station

The invention claimed is:

1. User equipment, comprising:
a transmission and reception unit configured to transmit and receive one or more radio signals to and from a base station; and
a capability information indication unit configured to transmit capability information to the base station in one or more of the radio signals,
wherein:
the capability information includes information indicative of carrier aggregation (CA) capable carrier combinations and information regarding a relative arrangement of carriers in a case where carrier combinations are arranged within a same frequency band, and
the capability information indication unit indicates that all carrier combinations indicated in the capability information are CA capable carrier combinations.

2. The user equipment as claimed in claim 1, wherein the capability information indication unit indicates one carrier combination out of all the CA capable carrier combinations.

3. The user equipment as claimed in claim 1, wherein upon receiving a capability information request from the base station to cause a reporting exclusion function to be enabled, the capability information indication unit indicates support of the user equipment for the reporting exclusion function as well as all carrier combinations.

4. The user equipment as claimed in claim 2, wherein upon receiving a capability information request from the base station to cause a reporting exclusion function to be enabled, the capability information indication unit indicates support of the user equipment for the reporting exclusion function as well as the one carrier combination.

* * * * *